31-315

BEST AVAILABLE COPY

GEORGE CADE.

Improvement in Lamp-Wick Feeders.

No. 4,385. Reissued May 16, 1871.

*Fig. 1*

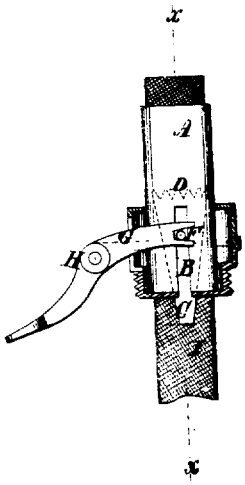

*Fig. 2*

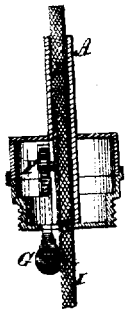

4,385.—LAMP-WICK FEEDER.—George Cade, Long Branch, N. J.—Patent No. 101,427, dated April 5, 1870.

*Claim.*—1. The combination, with a wick-tube, of a toothed sliding wick-feeder and operating-lever, G, substantially as specified.

2. The arrangement of the sliding wick-feeder C within the slotted wick-tube, in combination with the operating-lever G, substantially as described.

Witnesses.
Fred Haynes
Fred Busch

George Cade
per Brown Combs & Co
Attorneys

Defective — Wick Pickers

A.M. PHOTO-LITHOGRAPHIC CO. N.Y. OSBORNE'S PROCESS

United States Patent Office.

GEORGE CADE, OF LONG BRANCH, NEW JERSEY.

Letters Patent No. 101,427, dated April 5, 1870; reissue No. 4,385, dated May 16, 1871.

IMPROVEMENT IN LAMP-WICK FEEDERS.

The Schedule referred to in these Letters Patent and making part of the same.

*To all whom it may concern:*

Be it known that I, GEORGE CADE, of Long Branch, in the county of Monmouth and State of New Jersey, have invented a new and useful Improvement in Lamp-Wick Feeders; and I do hereby declare that the following is a full, clear, and exact description thereof, which will enable others skilled in the art to make and use the same, reference being had to the accompanying drawing forming part of this specification.

This invention relates to improvements in apparatus for feeding up the wick to the flame as it burns away; and It consists in an arrangement inside the wick-tube, which is slotted from the bottom upward a suitable distance, of a toothed carrying-plate, adapted to engage the wick and force it upward, and in the application to the said plate of a lever for moving it up and down, the said lever being pivoted to a suitable support on the burner and engaged with the lifting-plate so as to be readily detached.

Figure 1 is a side elevation of such a wick-tube and a section of the burner provided with my improved feeding device, of a shape to suit.

Figure 2 is a section of the same taken on the line *x x* of fig. 1.

Similar letters of reference indicate corresponding parts.

A is the wick-tube, provided with a slot, B, in one side, extending upward a suitable distance.

C is the wick-feeder, consisting of a thin plate of metal with notches forming teeth at the top, which teeth are bent inward, as shown at D, to engage the wick, when inserted in the tube between the slotted wall and wick, so as to force the wick upward.

When it is forced up, this plate has a stud, F, projecting out through the slot B of the wick-tube for connecting with the crotched end of a finger-lever, G, pivoted at H to supports projecting from the burner.

The notch in the end of the lever is so arranged as to depth that it will engage the stud F at the bottom of the slot B, and hold it while moving it to the top of the slot; but when down to the bottom of said slot will admit of pulling the plate C down out of the tube and away from connection with the lever.

When the wick I is put in the tube the plate or feeder C is placed between it and the slotted wall of the tube, and so adjusted that when the end of the wick is raised to the top of the tube the stud F will engage with the notched end of the lever, so as to be carried up by it when the outer end is pressed down. In this way the wick may be fed up until the stud arrives at the top of the slot. The wick is then held at the top of the tube by the fingers, while the feed-plate is forced back by the lever to take a new hold for continuing the feed in like manner.

This feeding device is believed to be much more reliable and accurate than toothed wheels, and is not more expensive, and it insures the feeding of the wick alike at each edge or in a uniform manner throughout, whereas the common toothed wheels sometimes feed one side faster than the other.

Having thus described my invention,

I claim as new and desire to secure by Letters Patent—

1. The combination, with a wick-tube, of a toothed sliding wick-feeder and operating-lever G, substantially as specified.

2. The arrangement of the sliding wick-feeder C within the slotted wick-tube, in combination with the operating-lever G, substantially as described.

GEORGE CADE.

Witnesses:

THOMAS L. WORTHLEY,

JAS. H. JOLINE.